United States Patent [19]

Toothill et al.

[11] Patent Number: 4,816,480

[45] Date of Patent: Mar. 28, 1989

[54] METHOD FOR THE PREPARATION OF FEED PREMIX IN COMPOSITIONS OF MADURAMICIN

[75] Inventors: Richard B. Toothill, Warren; Irving Klothen; Mimi Y. Schaaf, both of Princeton, all of N.J.

[73] Assignee: American Cyanamid Company, Stamford, Conn.

[21] Appl. No.: 49,053

[22] Filed: May 12, 1987

[51] Int. Cl.$^4$ .................... A61K 35/00; A61K 31/35
[52] U.S. Cl. .................................. 514/460; 424/119; 514/970

[58] Field of Search .................. 514/970, 456, 460; 424/119

[56] References Cited

U.S. PATENT DOCUMENTS 4,407,946  10/1983  Labeda et al. .................. 435/75

Primary Examiner—Frederick E. Waddell
Attorney, Agent, or Firm—John W. Hogan, Jr.

[57] ABSTRACT

A method for the preparation of feed premix compositions of the antibiotic maduramicin which have improved stability of the antibiotic at elevated temperatures and the stable feed premix compositions prepared thereby.

5 Claims, No Drawings

METHOD FOR THE PREPARATION OF FEED PREMIX IN COMPOSITIONS OF MADURAMICIN

BACKGROUND

Maduramicin is a new antibiotic that has been shown to be an effective anticoccidial agent. Its preparation and use are described in U.S. Pat. Nos. 4,278,663; 4,368,265; and 4,407,946.

Animal feedstuff compositions containing a therapeutic and/or prophylactic level of maduramicin may be readily prepared by admixing the drug or a salt thereof with the feedstuff directly or by admixing a premix containing the drug with the desired feedstuff. Feed premixes are normally prepared by admixing the drug or salt thereof, or a solution of the drug or a salt thereof with an edible substrate such as corn cob grits, soybean feed, corn meal or the like. Application for U.S. patent application Ser. No. 641,094 filed Aug. 18, 1984, incorporated herein by reference, describes the use of physiologically acceptable alcohols as solvents for the preparation of animal premix compositions containing manduramicin.

Unfortunately it has been observed that the stability of maduramicin and salts thereof at elevated temperatures in feed premix compositions is reduced when premixes are prepared with certain edible carriers.

It is an object of this invention to provide a method for preparing feed premix compositions containing maduramicin and salts thereof which have improved stability at both elevated temperatures and ambient temperatures over extended periods of time.

SUMMARY

The invention relates to a method for the preparation of feed premix compositions of maduramicin comprising treating an edible carrier with sufficient quantitites of gaseous ammonia, ammonium hydroxide or an ammonium salt to increase the pH of the edible carrier to greater than pH 7, and admixing the thus treated carrier with a solution of the ammonium salt of maduramicin in a physiologically acceptable alcohol.

Ammoniation of a variety of edible carriers of differing initial acidities in the range of pH 3.98 to 7.1 has resulted in feed premix compositions containing maduramicin as the ammonium salt which exhibit improved stability at elevated temperatures as illustrated in Table I below.

TABLE I

Effect of Ammoniation by Treatment with Ammonia Vapor on Retention of Maduramicin on Various Carriers at 75° C. for 88 Hours

| Carrier | pH[1] | Without Ammoniation % Maduracicin Retention* | pH[1] | With Ammoniation % Maduracicin Retention* |
|---|---|---|---|---|
| Domestic Corn Cob Grits | 5.3 | 71 | 8.4 | 90 |
| Domestic Soybean Feed | 7.1 | 84 | 9.0 | 89 |
| Taiwanese Extracted Corn Meal | 4.0 | 45 | 7.4 | 85 |
| Brazilian Corn Cob | 6.2 | 76 | 7.6 | 93 |

[1]Rounded to the nearest 0.1, determined by slurrying 1 g of carrier in 10 ml of deionized water Ammoniation of the carriers may be conveniently accomplished by a variety of techniques such as those listed in Table II below.

TABLE II

Ammoniation a. By Ammonia vapor
(1) In an enclosed container.
(2) In a closed container, followed by evacuation.
b. Treatment with ammonium hydroxide
(1) Slurry in an aqueous NH4OH solution, filtration and drying.
(2) Addition of various concentrations of aqueous NH4OH to the carrier and blending.
c. By addition of ammonium salts of weak acids
(1) Addition of NH4HCO3.
(2) Addition of (NH4)2CO3.

Premix compositions may then be readily prepared by admixing of the ammoniated carrier with a solution of the ammonium salt of maduramicin in a physiologically acceptable alcohol until a homogeneous free-flowing blend is obtained.

The invention is further illustrated by the following non-limiting examples.

EXAMPLE 1

Gaseous Ammoniation

Four hundred milliliters of concentrated NH4OH is placed in a tank (volume 4 liters). Three 100 ml beakers containing NH4OH are used to support the mesh trays containing the carriers listed in Table III below. The tank is covered overnight and the cover removed only for occasional mixing of the sample, during ammoniation by the ammonia vapor. Ammoniated samples are then aired until no ammonia odor is detected.

EXAMPLE 2

Gaseous Ammoniation in a Vacuum Dessicator Followed by Application of Vacuum

Six hundred milliliters of concentrated NH4OH is placed in a 250-mm I.D. vacuum dessicator. Carriers in mesh trays are placed on the metal shelf. After 5 hours of ammoniation, by exposure to the ammonia vapor, vacuum is applied overnight, until only a faint ammonia odor is detected in the substrate.

EXAMPLE 3

Ammoniation with 2N NH4OH (slurry)

Into a 400-ml beaker containing carrier (38 g) is added 200-ml of 2N NH4OH. The samples are filtered through a Buchner funnel using Whatman #541 filter paper, and rinsed with 100 ml of 2N NH4OH twice followed by 300 ml of deionized water three times. The filtrates are airdried before using.

EXAMPLE 4

Ammoniation with Aqueous NH4OH

Three different concentrations of ammonium hydroxide are added to wide mouth 1 oz. jars containing 3 grams of carrier.

| NH4OH Concentration Normality | Volume Added (μl) | % NH3 in Carrier |
|---|---|---|
| 15.3 (concentrated) | 100 | 0.98 |
| 3.1 (5 times dilution) | 100 | 0.20 |
| 0.6 (25 times dilution) | 100 | 0.04 |

Each mixture is stirred with a spatula and a lid is screwed on immediately. Samples are used with or without airing as foot-noted in Table III.

pared in duplicate when materials allow. Aliquots of benzyl alcohol solution are also weighed. Duplicate samples of the solution are heated as are the premixes at 75° C. for 88 hours and used as a reference. Duplicate or quadruplicate samples of the solution are set aside and used for initial concentration determinations.

The results of these experiments, which are summarized in Table III below, demonstrate the improvement in retention of maduramicin at elevated temperatures in premix compositions using carriers which have been ammoniated.

TABLE III

Effects of Substrate Treatment on Maduramicin Retention at 75° C.[1]

| | Domestic Corn Cob Grits | | | | | | Domestic Soybean Feed | | | | | | Taiwanese Ext'd Corn Meal | | Brazilian Corn Cob | |
|---|---|---|---|---|---|---|---|---|---|---|---|---|---|---|---|---|
| | Test 1 | | Test 2 | | Test 3 | | Test 1 | | Test 2 | | Test 3 | | Test 3 | | Test 3 | |
| Treatment | pH | %[2] | pH | %[2] | pH | %[2] | pH | %[2] | pH | %[2] | pH | %[2] | pH | %[2] | pH | %[2] |
| As Received | 5.3 | 71.3 | 5.1 | 79.9 | 5.1 | 61.2 | 7.1 | 83.9 | 7.1 | 90.4 | 7.0 | 82.1 | 4.0 | 45.3 | 6.2 | 76.3 |
| Example 1 | 8.2 | 87.2 | 8.2 | 95.5 | | | 8.6 | 92.7 | 8.6 | 98.6 | | | | | | |
| Example 2 | 8.4 | 90.3 | | | | | 9.0 | 89.3 | | | | | 7.4 | 84.6 | 7.6 | 93.0 |
| Example 3 | 8.1 | 91.3 | | | | | 7.9 | 89.1 | | | | | | | | |
| Example 1[3] | | | 5.7 | 82.0 | | | | | 7.0 | 81.2 | | | | | | |
| Example 4 (0.98% NH3) | | | | | 9.0 | 91.3 | | | | | 9.8 | 87.9 | | | | |
| Example 4 (0.98% NH3)[4] | | | | | 7.9 | 86.1 | | | | | 8.2 | 86.8 | | | | |
| Example 4 (0.20% NH3) | | | | | 7.3 | 80.9 | | | | | 8.9 | 90.6 | | | | |
| Example 4 (0.04% NH3) | | | | | 5.5 | 67.8 | | | | | 7.6 | 86.3 | | | | |
| Example 5 (0.43% NH3) | | | | | 8.5 | 88.6 | | | | | 8.9 | 91.0 | | | | |
| Example 5 (0.09% NH3) | | | | | 6.5 | 76.5 | | | | | 8.3 | 89.7 | | | | |
| Example 6 (0.41% NH3) | | | | | 7.1 | 91.6 | | | | | 7.5 | 92.0 | | | | |
| Example 6 (0.08% NH3) | | | | | 6.4 | 77.7 | | | | | 8.1 | 91.3 | | | | |
| Benzyl Alcohol Soln | | 84.0 | | 89.9 | | 85.4 | | | | | | | | | | |

NOTE:
[1]Samples were heated at 75° C. for 88 hours before assay.
[2]% - % retention, all premixes initially contained approximately 1% of maduramicin.
[3]Ammoniated carrier heated at 75° C. for 88 hours prior to premix preparation.
[4]Ammoniated carriers are aired prior to premix preparation.

EXAMPLE 5

Ammoniation with (NH4)2CO3.H2O

Two concentrations of (NH4)2CO3.H2O are used. The higher concentration samples are prepared by adding 38.5±0.5 mg of (NH4)2CO3.H2O (containing 33.4% of NH3) followed by 100 μl of deionized water to 3 grams of carrier. The lower concentration samples are prepared by adding 100 μl of (NH4)2CO3 solution (3.845 g (NH4)2CO3.H2O/50 ml DI water, equivalent to 76.9 mg/ml), yielding carriers containing 0.43% ammonia and 0.09% ammonia respectively.

EXAMPLE 6

Ammoniation with NH4HCO3

Samples are prepared in a manner similar to Example 5 above. 56.9±2 mg of NH4HCO 3 is added to 3 g of carrier for the higher concentration samples and NH4HCO3 solution (5.636 g/50 ml D.I. water, 113 mg/ml) is added for the lower concentrations, yielding carriers containing 0.41% ammonia and 0.08% ammonia respectively.

EXAMPLE 7

Preparation and evaluation of premix compositions

Deionized water (0.5 ml) is added to a 10.0 ml solution of the ammonionium salt of maduramicin in benzyl alcohol (20% solution by weight). Then 200-or 150-μl of the thus prepared solution is pipeted to 3.0 g±10% of each of the carriers. Amounts of solution added are determined by weighing. The premixes contained approximately 1% of maduramicin. All samples are prepared in duplicate when materials allow. Aliquots of benzyl alcohol solution are also weighed. Duplicate samples of the solution are heated as are the premixes at 75° C. for 88 hours and used as a reference. Duplicate or quadruplicate samples of the solution are set aside and used for initial concentration determinations.

What is claimed is:

1. A method for improving the stability of feed premix compositions of maduramicin at elevated temperatures comprising ammoniation of an edible carrier to a pH of greater than about pH 7.1, and admixing the ammoniated carrier with a solution of maduramicin or the ammonium salt thereof in a physiologically acceptable alcohol.

2. A method according to claim 1, wherein the ammoniating agent is gaseous ammonia, ammonium hydroxide, ammonium salts of weak acids, or a mixture thereof.

3. A method according to claim 2, wherein an edible carrier is ammoniated with gaseous ammonia.

4. A feed premix composition of maduramicin and an edible carrier which is stable at elevated temperatures, comprising
    (a) an edible carrier which has been ammoniated to raise its pH to over about pH 7.1, which is admixed with
    (b) a compound selected from the group consisting of maduramicin, the ammonium salt of maduramicin and mixtures thereof in a
    (c) physiologically acceptable alcohol.

5. An improved maduramicin feed premix composition wherein the improvement consists of increasing the stability of said composition at elevated temperatures by ammoniating an edible carrier to a pH ≧ about 7.1 prior to admixing the ammoniated carrier with a solution of maduramicin or the ammonium salt thereof in a physiologically acceptable alcohol.

* * * * *